(12) United States Patent
van der Heide

(10) Patent No.: US 9,524,338 B2
(45) Date of Patent: Dec. 20, 2016

(54) PLAYBACK OF MEDIA CONTENT ACCORDING TO MEDIA PREFERENCES

(71) Applicant: Sonos, Inc., Santa Barbara, CA (US)

(72) Inventor: Maarten van der Heide, Goleta, CA (US)

(73) Assignee: Sonos, Inc., Santa Barbara, CA (US)

( * ) Notice: Subject to any disclaimer, the term of this patent is extended or adjusted under 35 U.S.C. 154(b) by 26 days.

(21) Appl. No.: 14/263,750

(22) Filed: Apr. 28, 2014

(65) Prior Publication Data

US 2015/0310023 A1    Oct. 29, 2015

(51) Int. Cl.
*G06F 17/00* (2006.01)
*G06F 17/30* (2006.01)

(52) U.S. Cl.
CPC ..... *G06F 17/3074* (2013.01); *G06F 17/30766* (2013.01); *G06F 17/30772* (2013.01)

(58) Field of Classification Search
CPC ................... G06F 17/30752; G06F 17/30766; G06F 17/30749; G06F 17/3074; G06F 17/30772

See application file for complete search history.

(56) References Cited

U.S. PATENT DOCUMENTS

| | | | |
|---|---|---|---|
| 5,923,902 A | 7/1999 | Inagaki | |
| 6,108,686 A | 8/2000 | Williams, Jr. | |
| 6,256,554 B1 | 7/2001 | DiLorenzo | |
| 6,349,339 B1 | 2/2002 | Williams | |
| 6,404,811 B1 | 6/2002 | Cvetko et al. | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |

(Continued)

FOREIGN PATENT DOCUMENTS

| | | |
|---|---|---|
| KR | 100890993 | 3/2009 |
| WO | 0153994 | 7/2001 |

OTHER PUBLICATIONS

"Bluetooth. "Specification of the Bluetooth System: The ad hoc SCATTERNET for affordable and highly functional wireless connectivity" Core, Version 1.0 A, Jul. 26, 1999, 1068 pages". (in four parts due to size).

(Continued)

*Primary Examiner* — Fan Tsang
*Assistant Examiner* — David Siegel
(74) *Attorney, Agent, or Firm* — McDonnell Boehnen Hulbert & Berghoff LLP

(57) ABSTRACT

Methods and systems described herein relate to management of media playback based on media preferences. A computing device may receive data indicating that a media item is available to be played by a media playback system. A media preference associated with the media item may then be identified based on the received data. The media preference may be identified in a preference database. Based on the media preference, the computing device determines whether the media item is or is not to be played by the media playback system. If a determination is made that the media item is not to be played, the computing device sends to the media playback system, an indication that the media item is not to be played. If a determination is made that the media item is to be played, the computing device causes the media item to be played by the media playback system.

20 Claims, 6 Drawing Sheets

(56) References Cited

U.S. PATENT DOCUMENTS

| | | |
|---|---|---|
| 6,763,040 B1 | 7/2004 | Hite et al. |
| 6,778,869 B2 | 8/2004 | Champion |
| 6,826,283 B1 | 11/2004 | Wheeler et al. |
| 6,915,176 B2 | 7/2005 | Novelli et al. |
| 6,985,694 B1 | 1/2006 | De Bonet et al. |
| 7,124,125 B2 | 10/2006 | Cook et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,739 B2 | 6/2007 | Chang |
| 7,236,773 B2 | 6/2007 | Thomas |
| 7,483,538 B2 | 1/2009 | McCarty et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,599,685 B2 | 10/2009 | Goldberg et al. |
| 7,643,894 B2 | 1/2010 | Braithwaite et al. |
| 7,657,224 B2 | 2/2010 | Goldberg et al. |
| 7,657,910 B1 | 2/2010 | McAulay et al. |
| 7,725,533 B2 | 5/2010 | Szeto et al. |
| 7,725,551 B2 | 5/2010 | Szeto et al. |
| 7,739,271 B2 | 6/2010 | Cook et al. |
| 7,742,740 B2 | 6/2010 | Goldberg et al. |
| 7,797,471 B2 | 9/2010 | Laefer et al. |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,916,877 B2 | 3/2011 | Goldberg et al. |
| 7,917,082 B2 | 3/2011 | Goldberg et al. |
| 7,995,899 B2 | 8/2011 | Heredia et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,103,009 B2 | 1/2012 | McCarty et al. |
| 8,214,873 B2 | 7/2012 | Weel |
| 8,230,099 B2 | 7/2012 | Weel |
| 8,234,395 B2 | 7/2012 | Millington |
| 8,271,114 B2 | 9/2012 | Lydon et al. |
| 8,386,413 B2 | 2/2013 | Samadani |
| 8,595,793 B2 | 11/2013 | Kashyap et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0056117 A1 | 5/2002 | Hasegawa et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2004/0088328 A1 | 5/2004 | Cook et al. |
| 2006/0161621 A1* | 7/2006 | Rosenberg .......... H04L 67/1095 709/204 |
| 2006/0253436 A1 | 11/2006 | Cook et al. |
| 2007/0088747 A1 | 4/2007 | Cheng et al. |
| 2007/0142944 A1 | 6/2007 | Goldberg et al. |
| 2007/0294131 A1 | 12/2007 | Roman et al. |
| 2008/0052371 A1 | 2/2008 | Partovi et al. |
| 2008/0124056 A1 | 5/2008 | Concotelli |
| 2009/0307062 A1 | 12/2009 | Lutnick et al. |
| 2010/0017366 A1 | 1/2010 | Robertson et al. |
| 2010/0138517 A1* | 6/2010 | De Los Reyes ....... G06Q 40/00 709/218 |
| 2010/0205222 A1 | 8/2010 | Gajdos et al. |
| 2010/0215336 A1 | 8/2010 | McLean |
| 2010/0235741 A1 | 9/2010 | Newman et al. |
| 2010/0262909 A1 | 10/2010 | Hsieh |
| 2011/0106954 A1 | 5/2011 | Chatterjee et al. |
| 2011/0113051 A1 | 5/2011 | Lindahl et al. |
| 2011/0265003 A1 | 10/2011 | Schubert et al. |
| 2012/0070017 A1 | 3/2012 | Dorogusker et al. |
| 2012/0071996 A1 | 3/2012 | Svendsen |
| 2013/0073584 A1 | 3/2013 | Kuper et al. |
| 2013/0173034 A1 | 7/2013 | Reimann |
| 2013/0268396 A1 | 10/2013 | Agevik et al. |
| 2013/0279878 A1 | 10/2013 | Haverkamp |
| 2013/0346859 A1 | 12/2013 | Bates |
| 2013/0347018 A1 | 12/2013 | Limp et al. |
| 2014/0096219 A1 | 4/2014 | Lang et al. |
| 2014/0123006 A1 | 5/2014 | Chen et al. |
| 2014/0129015 A1 | 5/2014 | Lindahl et al. |
| 2014/0277639 A1 | 9/2014 | Gomes-Casseres et al. |
| 2014/0331332 A1 | 11/2014 | Arrelid et al. |
| 2015/0066494 A1 | 3/2015 | Salvador et al. |

OTHER PUBLICATIONS

"Bluetooth. "Specification of the Bluetooth System: Wireless connections made easy" Core, Version 1.0 B, Dec. 1, 1999, 1076 pages". (in four parts due to size).
"Dell, Inc. "Dell Digital Audio Receiver: Reference Guide" Jun. 2000, 70 pages". (in two parts due to size).
"Dell, Inc. "Start Here" Jun. 2000, 2 pages".
"Jones, Stephen. "Dell Digital Audio Receiver: Digital upgrade for your analog stereo" Analog Stereo. Jun. 24, 2000 < http://www.reviewsonline.com/articles/961906864.htm> retrieved Jun. 18, 2014, 2 pages".
"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".
"Palm, Inc. "Handbook for the Palm VII Handheld" May 2000, 311 pages".
"Presentations at WinHEC 2000" May 2000, 138 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Buskirk; Eliot Van., "Music Needs 'Connective Tissue' and Facebook Wants to Build it", Evolver-1m, http://evolver.fm/2011/09/01/music-needs-connective-tissue-and-facebook-wants-to-build-iti, Sep. 1, 2011, 6 pages.
Co-pending U.S. Appl. No. 14/042,160, filed Sep. 30, 2013.
"International Preliminary Report on Patentability and Written Opinion, issued by the International Searching Authority in connection with International patent application No. PCT/US2012/056467 mailed on Apr. 3, 2014, 11 pages.".
"International Search Report for Application No. PCT/US2012/056467, mailed on Feb. 28, 2013".
Jo J., et al., "Synchronized One-to-many Media Streaming with Adaptive Playout Control," Proceedings of SPIE, 2002, vol. 4861, pp. 71-82.
"UPnP; "Universal Plug and Play Device Architecture"; Jun. 8, 2000; version 1.0; Microsoft Corporation; pp. 1-54".
Non-Final Office Action mailed on Jan. 5, 2016, issued in connection with U.S. Appl. No. 14/263,743, filed Apr. 28, 2014, 10 pages.
Notice of Allowance mailed on Jun. 15, 2016, issued in connection with U.S. Appl. No. 14/263,743, filed Apr. 28, 2014, 5 pages.
International Searching Authority, International Search Report and Written Opinion mailed on Jul. 13, 2015 (received on Apr. 14, 2016), issued in connection with International Application No. PCT/US2015/027761, filed on Apr. 27, 2015, 12 pages.

* cited by examiner

| Track Title | Artist Name | Album Name | Genre | Preference |
|---|---|---|---|---|
| Track 23 | Artist 1 | Compilation 4 | Genre 3 | - |
| Track 54 | Artist 1 | Album 7 | Genre 3 | - |
| Track 1 | Artist 7 | Album 2 | Genre 5 | + |
| Track 502 | --- | Compilation 4 | Genre 3 | - |
| Track 43 | Artist 1 | Album 7 | Genre 3 | + |
| Track 7 | Artist 7 | --- | Genre 5 | - |
| Track 666 | Artist 4 | Album 54 | --- | + |
| Track 89 | Artist 53 | Album 9 | Genre 2 | - |
| --- | --- | --- | Genre 3 | + |
| Track 327 | Artist 90 | Compilation 7 | --- | - |
| Track 19 | Artist 45 | Album 91 | Genre 3 | . |
| . | . | . | . | . |

PLAYBACK OF MEDIA CONTENT ACCORDING TO MEDIA PREFERENCES

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 7 shows aspects of an example preference database.

Figure 1:
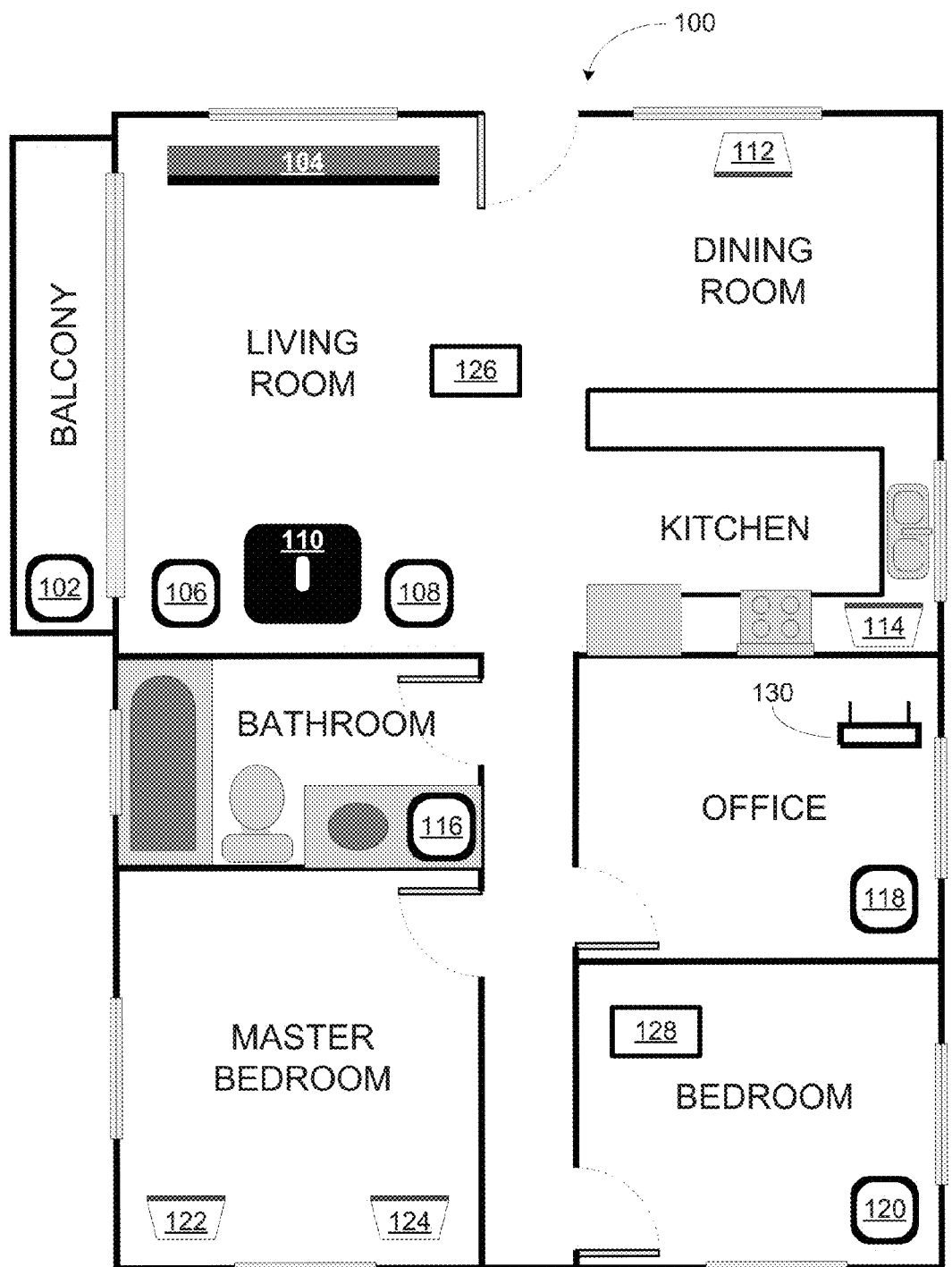
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein involve managing playback of media based on media preferences. In particular, some embodiments involve preventing media content from being played based on negative media preferences associated with the media content. In one embodiment, a computing device, such as a device associated with a media playback system, may receive an indication that a media item is available to be played by the media playback system. The computing device may then identify a media preference associated with the media item. In one example, the media preference may be identified in a preference database associated with the media playback system. Based on the identified media preference, the computing device may then determine whether the media content should be played. If the identified media preference is a negative media preference, the computing device may determine that the media item should not be played and prevent the media item from being played.

In one example, the media playback system may be configured to play media content provided by a service provider. Accordingly, the service provider may provide information regarding media content that the service provider is and/or will be providing to the media playback system for playback. The information may include metadata identifying one or more of a track title, artist name, album name, and genre of the media content, among other information.

Upon receiving an indication that the media playback system is to play particular media content, the computing device may identify one or more media preferences associated with the media content. In one example, the computing device may access a preference database to identify the one or more media preferences. The preference database may be a database of media preferences associated with the media playback system, and/or any user profiles associated with the media playback system. In one case, the database may include media preferences received in association with specific media items. In another case, the database may include media preferences associated with groups of media items, such as media items within one or more genres, or media items by one or more artists. In either case, the preference database includes information identifying media content, and media preferences associated with the media content.

If a negative media preference is identified, the computing device may determine that the media content should not be played. In this case, the media playback system may send to the media playback system (or a playback device in the media playback system that would otherwise play the media content), an indication that the playback device is not to play the media content. Alternatively, if a positive media preference or no media preference is identified, the computing device may determine that the media content should be played as provided by the service provider. In this case, the media playback system may allow the media content to be played by the playback device, or send an indication that the media content can be played. Other examples, including those that will be discussed in the following sections, are also possible.

As indicated above, the present application involves managing media playback based on media preferences. In one embodiment, a method is provided. The method involves receiving, by a computing device, data indicating that a media item is available to be played by a playback device, and based on the received data, identifying, by the computing device, in a preference database associated with the media playback system, a media preference. The method also involves, based on the identified media preference, determining, by the computing device, that the media item is not to be played by the playback device, and sending, by the computing device, an indication that the media item is not to be played.

In another embodiment, a device is provided. The device includes a processor and memory having stored thereon instructions executable by the processor to cause the device to perform functions. The functions include receiving data indicating that a media item is available to be played by a playback device, and based on the received data, identifying in a preference database associated with the media playback system, a media preference. The functions also include, based on the identified media preference, determining that the media item is not to be played by the playback device, and sending an indication that the media item is not to be played.

In another embodiment, a non-transitory computer readable memory is provided. The non-transitory computer readable memory has stored thereon instructions executable by a computing device to cause the computing device to perform functions. The functions include receiving data indicating that a media item is available to be played by a playback device, and based on the received data, identifying in a preference database associated with the media playback system, a media preference. The functions also include, based on the identified media preference, determining that the media item is not to be played by the playback device, and sending an indication that the media item is not to be played.

In another embodiment, a method is provided. The method involves receiving, by a computing device, data indicating that a media item is available to be played by a playback device, and based on the information associated with the media item, identifying, by the computing device, a media preference. The method further involves, based on the identified media preference, determining that the media item is to be played by the playback device, and causing the media item to be played.

In another embodiment, a device is provided. The device includes a processor and memory having stored thereon instructions executable by the processor to cause the device to perform functions. The functions include receiving data indicating that a media item is available to be played by a playback device, and based on the information associated with the media item, identifying a media preference. The functions further include, based on the identified media preference, determining that the media item is to be played by the playback device, and causing the media item to be played.

In another embodiment, a non-transitory computer readable memory is provided. The non-transitory computer readable memory has stored thereon instructions executable by a computing device to cause the computing device to perform functions. The functions include receiving data indicating that a media item is available to be played by a playback device, and based on the information associated with the media item, identifying a media preference. The functions further include, based on the identified media preference, determining that the media item is to be played by the playback device, and causing the media item to be played.

In another embodiment, a method is provided. The method involves receiving, by a computing device, data indicating that a media item is available to be played by a playback device, and based on the received data, identifying, by the computing device, a media preference. The method further involves, based on the identified media preference, determining, by the computing device, one of the following: (a) that the media item is not to be played by the playback device, and (b) that the media item is to be played by the playback device. If a determination is made that the media item is not to be played by the playback device, the method involves sending, by the computing device, an indication that the media item is not to be played. If a determination is made that the media item is to be played, the method involves causing, by the computing device, the media item to be played.

In another embodiment, a device is provided. The device includes a processor and memory having stored thereon instructions executable by the processor to cause the device to perform functions. The functions include receiving data indicating that a media item is available to be played by a playback device, and based on the received data, a media preference. The functions further include, based on the identified media preference, determining one of the following: (a) that the media item is not to be played by the playback device, and (b) that the media item is to be played by the playback device. If a determination is made that the media item is not to be played by the playback device, the functions include sending an indication that the media item is not to be played. If a determination is made that the media item is to be played, the functions include causing the media item to be played.

In another embodiment, a non-transitory computer readable memory is provided. The non-transitory computer readable memory has stored thereon instructions executable by a computing device to cause the computing device to perform functions. The functions include receiving data indicating that a media item is available to be played by a playback device, and based on the received data, identifying a media preference. The functions further include, based on the identified media preference, determining one of the following: (a) that the media item is not to be played by the playback device, and (b) that the media item is to be played by the playback device. If a determination is made that the media item is not to be played by the playback device, the functions include sending an indication that the media item is not to be played. If a determination is made that the media item is to be played, the functions include causing the media item to be played.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
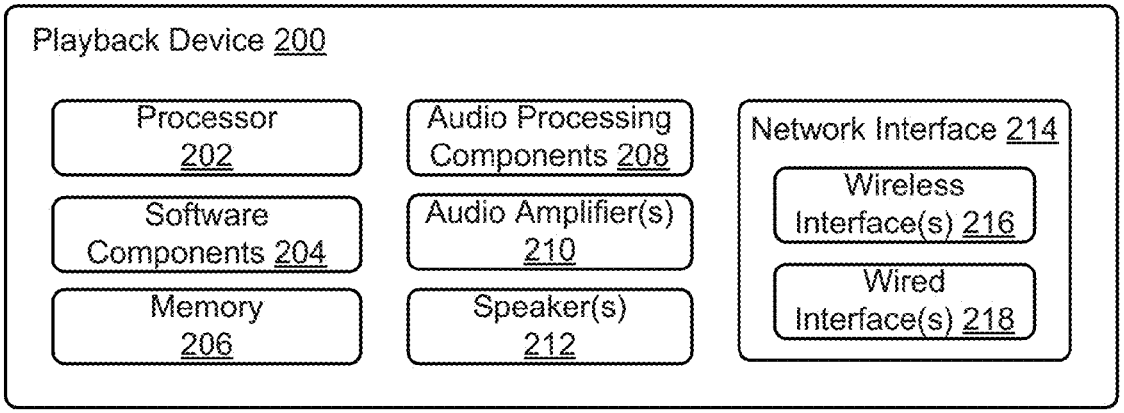
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
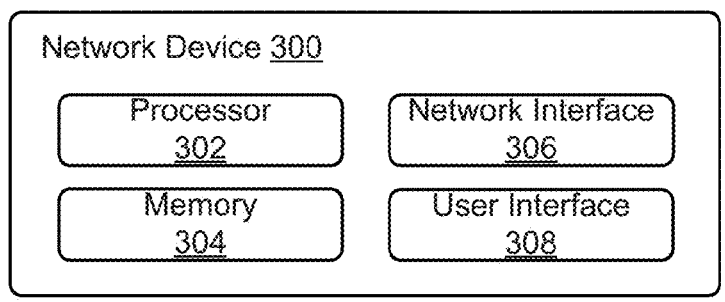
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
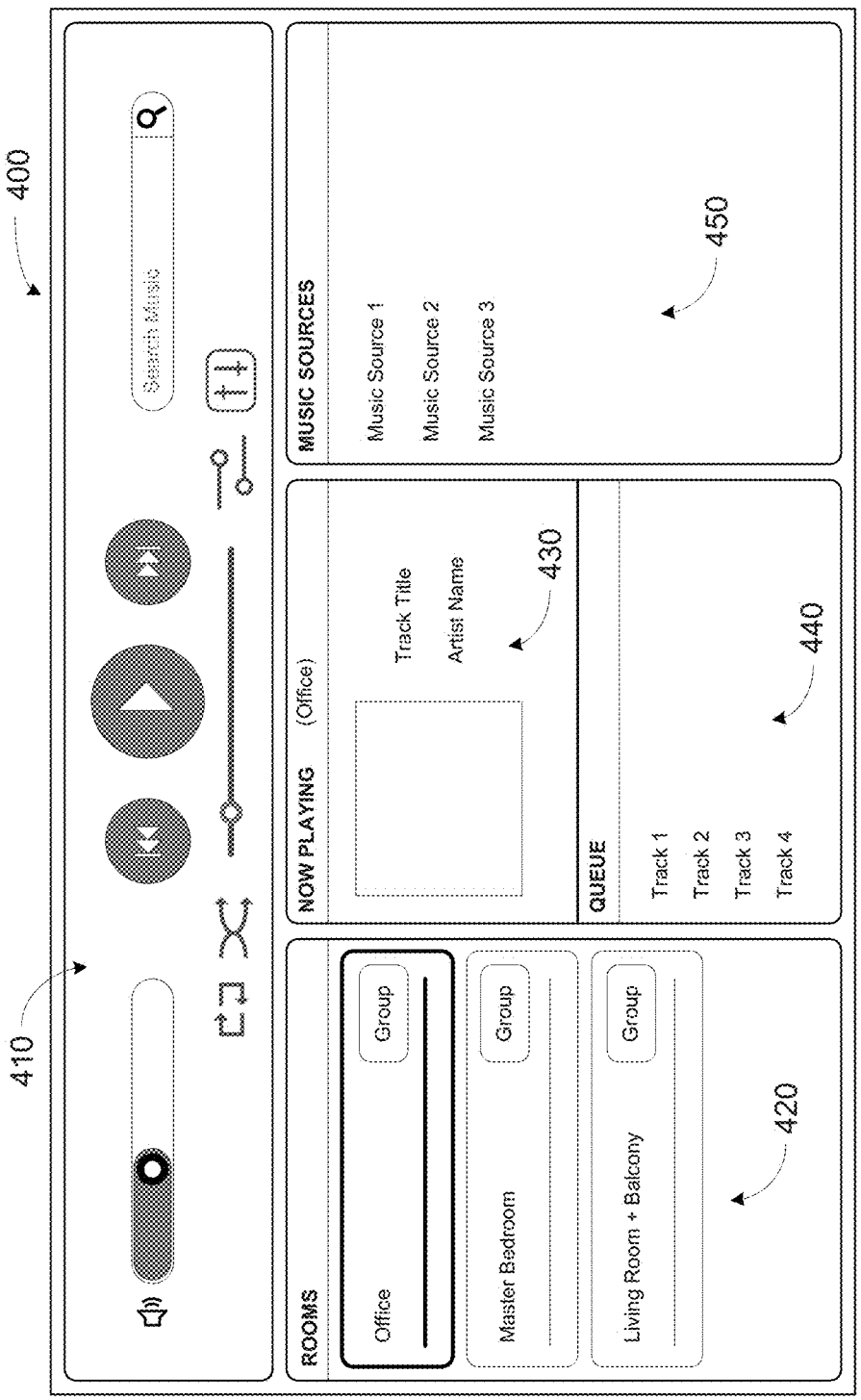
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Method for Managing Playback of Media Content

As discussed above, examples described herein may involve managing media playback based on media preferences. FIG. 500 shows an example media playback system environment 500 within which the embodiments may be implemented. As shown, the media playback system environment 500 includes an example service provider 502, an example media system server 504, and an example media playback system 506. Each of the service provider 502, media system server 504, and media playback system may communicate with each other either directly, or indirectly via another device, over a local area network (LAN), wide area network (WAN) or some combination thereof.

The media playback system 506 may be a playback system such as that described above in connection to FIG. 1, and may include one or more playback devices configured to play media content in synchrony within one or more playback zones. In one example, the media playback system 506 may be accessed using one or more user profiles.

The media system server 504 may be a server associated with the media playback system 506 and/or a provider of media playback system 506. The media system server 504 may store information, such as playback device information, playback zone information, service provider association information, and/or user profile information, among other information for media playback systems, such as the media playback system 506.

The service provider 502 may provide media content for playback by the media playback system 506. The media playback system 506 may access the service provider 502 using a user account. As such, the one or more user profiles used to access the media playback system 506 may use the user account to access the service provider 502. The service provider 502 may be a media streaming service that provides individual media items and/or collections of media items (i.e. albums, playlists, radio channels, etc.). In one example, the service provider 502 may provide a curated playlist based on media preferences and/or inputs of a user account for the service provider 502. In one case, the service provider 502 may, in response to a request for a particular genre of music, provide a series of music within the particular genre. In another case, the service provider 502 may provide a series of music selected based on media preferences associated with the user account. Other examples of services available through service provider 502 are also possible.

In some cases, the service provider 502 may provide a media item to a user account used to access the service provider 502 (and/or a user profile associated with the media playback system 506), but the user account/user profile may actually have a negative media preference associated with the media item. For instance, the user account and/or user profile may be associated with a negative media preference for a particular artist within the genre of music. Nonetheless, if the service provider 502 is providing media content based on a request for the genre of music and/or based on a positive media preference for the genre of music that is associated with the user account, the service provider 502 may provide media items by the particular artist, despite the negative media preference for the particular artist.

Figure 5:
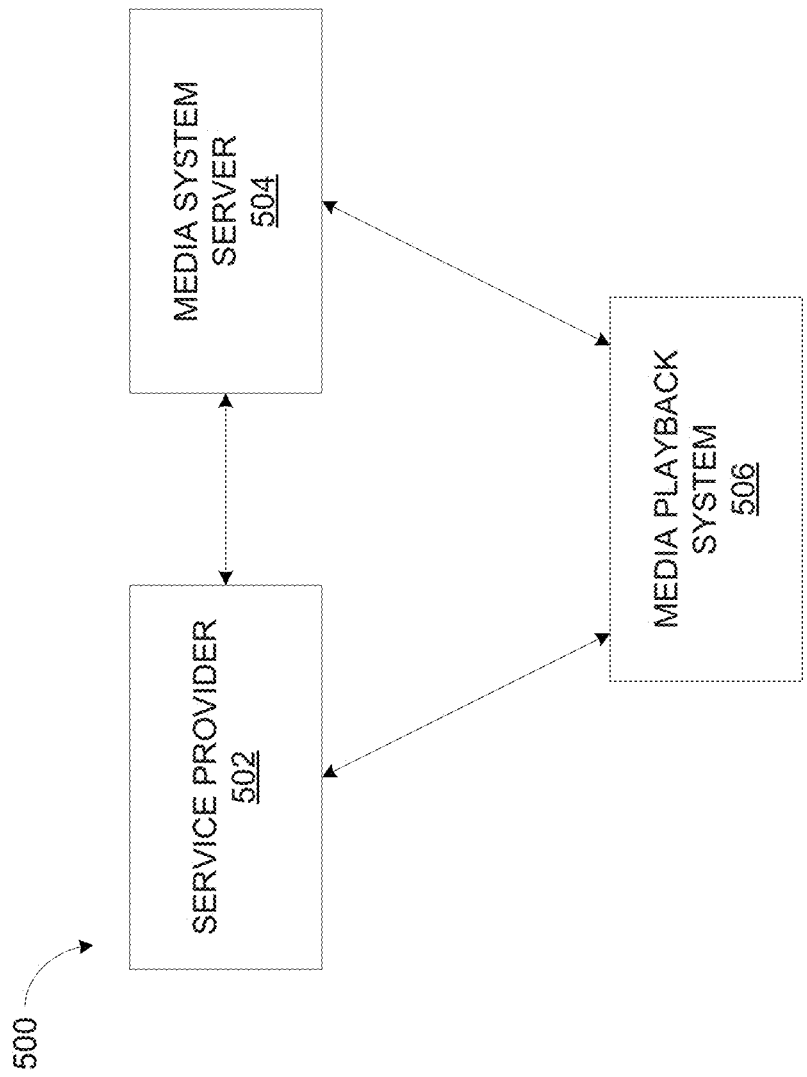
FIG. 5 shows an example media playback system environment.
Figure 6:
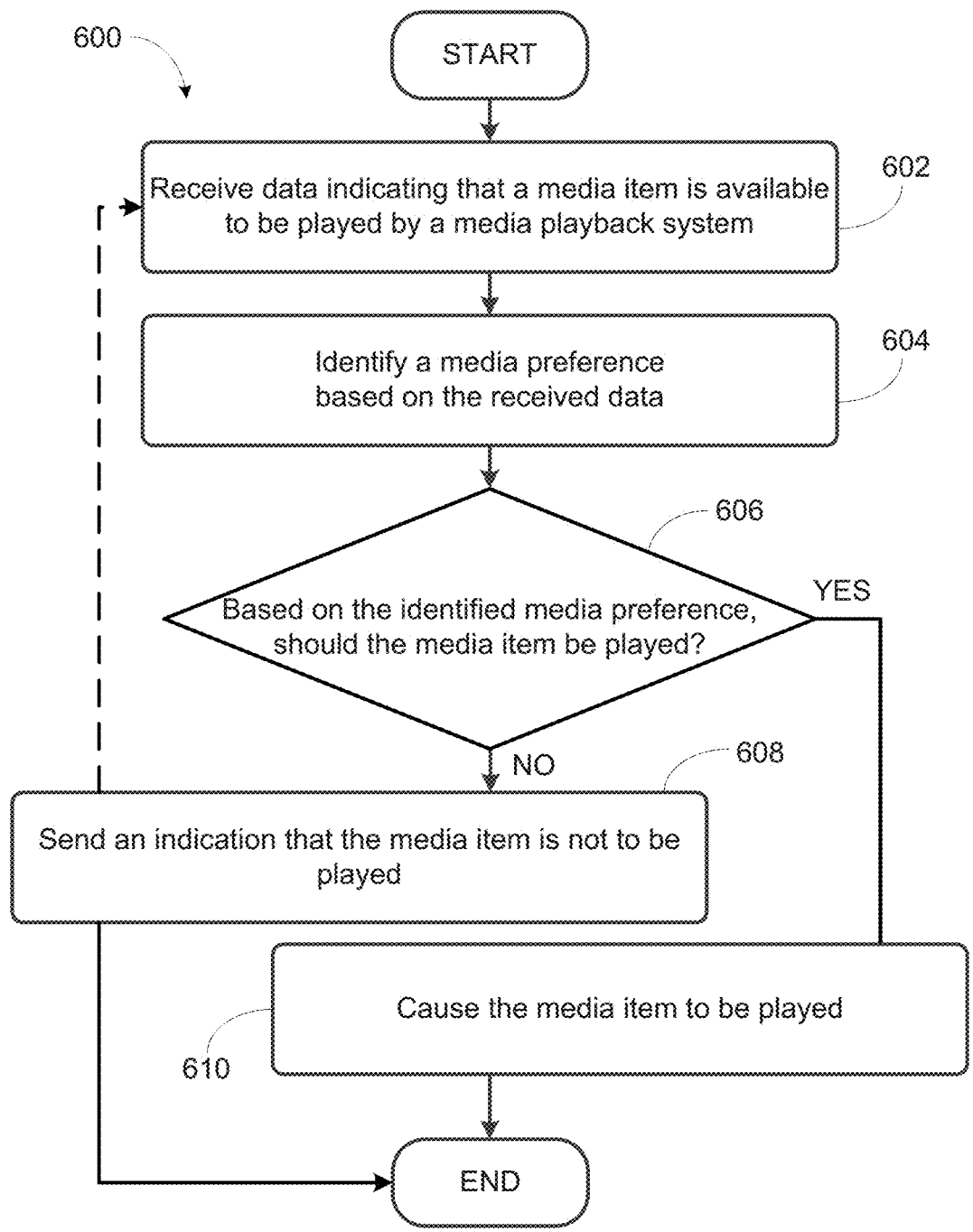
FIG. 6 shows an example flow diagram of a method for managing playback of media content based on media preferences.

Embodiments described herein may be implemented for managing playback of media content based on media preferences such that media items is not played if the media if a negative media preference is associated between the media item and a user account and/or user profile. FIG. 6 shows an example flow diagram of an example method 600 for such an embodiment. Method 600 shown in FIG. 6 presents an embodiment of a method that can be implemented within an operating environment involving, for example, the media playback system 100 of FIG. 1, one or more of the playback device 200 of FIG. 2, one or more of the control device 300 of FIG. 3, and the media playback system environment 500 of FIG. 5. In other words, the method 600 may be performed by any one or more of the devices, systems, and servers described above. In one example, the functions of the embodiments as discussed herein are performed by the media system server 504. In another example, the functions may alternatively be performed by one or more devices associated with the media playback system 506, such as one or more playback devices in the media playback system 506 and/or one or more controller devices used to access the media playback system 506. In a further example, the functions may be performed in part by the media system server 504 and in part by one or more devices in the media playback system 506. Other examples are also possible.

Method 600 may include one or more operations, functions, or actions as illustrated by one or more of blocks 602-610. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, the method 600 involves receiving data indicating that a media item is available to be played by a playback device. Continuing with the examples above, the playback device may be a playback device in the media playback system 506. In one example, the data may be received from the service provider 502. In another example, the data may be received from a controller device, or another device associated with the media playback system 506. The data may include metadata identifying the media item. The metadata may indicate one or more of a track title, artist name, album name, genre, or contextual information such as a time of day, season, or activity the media item may be associated with or suitable for, among others.

The media item may be a media item identified by the service provider 502 based on a request for media content to be played by the playback device. In one example, the data may be provided by the service provider 502 when a transmission of media data for the media item to the playback device. In one example, the data may be provided to the media system server 504 from the service provider 502. For instance, the service provider 502 may provide the data to the media system server 504 while providing the media data to the playback device of the media playback system 506. In another example, the data may be provided to the media playback system 506. In a further example, the data may be provided to the media system server 504 from the service provider 502 via the media playback system.

At block 604, the method 600 involves identifying a media preference based on the received data. In one example, the media preference may be identified in a preference database. In one case, the preference database may be affiliated with the media playback system 506, and may contain various media preferences associated with user profiles and media items associated with the media playback system 506. In one instance, media preferences in the preference database may have been provided as feedback to media items provided by the service provider 502 and/or any other service providers that provide media content to the media playback system 506. In another instance, media preferences in the preference database may have been provided as part of setting up and customizing one or more user profiles. Other examples of providing media preferences may exist.

FIG. 7 shows an example preference database 700 that may be affiliated with the media playback system 506. In one example, the preference database 700 may be stored on one or more remote servers, such as the media system server 504. In another example, the preference database may be stored on one or more local devices in communication with the media playback system 506. In a further example, parts of the preference database may be stored on the one or more remote servers and the one or more local devices. Other examples are also possible.

As shown, the preference database 700 includes columns for information identifying a media item, including a track title column, an artist name column, an album name column, and a genre column. For each media item entry, a media preference associated with the media item is shown in a media preference column. In this example, a "+" in the media preference column may indicate a positive media preference for the respective entry, and a "–" in the media preference column may indicate a negative media preference for the respective entry. In some cases, the media preferences may alternatively be on a gradient scale, rather than a binary scale. For instance, a media preference may range from one to five, with "one" indicating a relatively negative preference and "five" indicating a relatively positive preference. Other examples are also possible.

One having ordinary skill in the art will appreciate that the preference database 700 and the entries shown in FIG. 7 are for illustration purposes only and should not be considered limiting. Other database formats for storing media preferences are also possible.

In one example, additional columns may be included. For instance, a service-provider identification column for the media item may be included. If the media item was being accessed through the service provider 502 when the user provided the media preference for the media item, a service-provider identification of the media item used by the service provider 502 to identify the media item may be recorded in the service-provider identification column for the respective entry. In another example, a user profile column identifying a user profile associated with the respective entry and respective media preference may also be included in the preference database 700.

Referring back to block 604, identifying a media preference based on the received data may, in one example, involve sending to an external preference source (such as another service provider, for example), a request for preference data based on the received data, and receiving the preference data in response to the request. In another example, as mentioned previously, identifying a media preference based on the received data may involve searching in the preference database (whether the database is stored locally or remotely) for database entries associated with the media item. The search may be based on metadata associated with the media item.

In one instance, the identified media preference may be directly associated with the media item. For instance, referring to FIG. 7, if the metadata indicates a track title of "Track 23" and an artist name of "Artist 1," a media preference for a database entry having a matching track title and artist name may be identified in the preference database. As shown in the preference database 700, a negative media preference may accordingly be identified as being associated with the media item having the track title of Track 23 and the artist name of Artist 1.

In some cases, the search for database entries in the preference database may be implemented such that exact matches are required. For instance, if the metadata indicates a different album name than "Compilation 4," as shown in FIG. 7, then the media preference associated with Track 23 and Artist 1 may not be identified as relevant to the media item.

In some other cases, the search for database entries in the preference database 700 may be implemented according to an approximate string matching (or "fuzzy matching"). In such a case, if the metadata indicates a different album name than "Compilation 4" for Track 23 and Artist 1, the media preference associated with the entry in the preference database 700 having a track title of Track 23 and an artist name of Artist 1 may still be recognized as being applicable to the media item.

In another example, the identified media preference may be indirectly associated with the media item, but rather associated with media content similar to the media item. For instance, the received metadata may indicate a genre of the media item. In this case, if media preferences associated with entries in the preference database having the indicated genre are positive or negative, a media preference that is positive or negative, respectively, may be identified for the media item. In one case, as shown in FIG. 7, a positive media preference may be associated with an entry having only a genre of "Genre 3." As such, a positive media preference may be identified for the media item if the metadata received for the media item indicates a genre of Genre 3.

In yet another example, the media playback system 506 may recognize particular nuances in the media preferences stored in the preference database 700. For instance, a positive media preference may be associated with all entries in the preference database 700 having genre of Genre 3, except for entries having an artist name of Artist 1. As such, a positive media preference may be identified if the metadata for the media item indicates a genre of Genre 3, but a negative media preference may be identified if the metadata for the media item also indicates an artist name of Artist 1. Other implementations of database searching, including some combination of the examples discussed above are also possible.

In some cases, as discussed above, one or more user profiles may be used to access the media playback system 506, and the preference database 700 may include an additional column indicating a user profile associated with a respective entry. In such a case, identifying the media preference associated with the media item may further involve identifying a user profile that is accessing the media playback system 506 when the data indicating that the media item is available to be played is received at block 502. As such, identification of the media preference may also be based on the user profile that is accessing the media playback system 506. Accordingly, media preferences associated with the user profile may be applicable only when the user profile is accessing the media playback system 506.

As indicated above, the preference database 700 is affiliated with the media playback system 506, and contains media preferences associated with user profiles of the media playback system 506 and media content played by the media playback system 506. Accordingly, in some examples, the service provider providing the media item to be played, and the service providers that previously provided media items for which media preferences were provided, may not be relevant when identifying a preference for a media item. For instance, if the data received at block 602 is from the service provider 502, the entry in the preference database 700 matching the media item based on the received data may be, in one case, associated with the service provider 502 because the service provider 502 provided the media item when the entry was added to the preference database, or in another case, associated with another service provider. Whichever the case, the same media preference may be identified for the media item based on the entry in the preference database 700, independent of the service provider associated with the entry in the preference database 700.

At block 606, the method involves determining, based on the identified media preference, whether the media item should be played. In some cases, the identified media preference may be one of either a positive media preference or a negative media preference. In such cases, if the identified media preference is a positive media preference, a determination may be made that the media item should be played. On the other hand, if the identified media preference is a negative media preference, a determination may be made that the media item should not be played.

In some other cases, the identified media preference may not be only one of either a negative media preference or a positive media preference. For instance, the identified media preference may include multiple media preferences, including both positive and negative media preferences. In such a case, a determination may be made based on the different media preferences. In one example, different associations between the media item and media preferences in the preferences database may be weighted differently, and a determination of whether the media item should be played may be based on an average or sum of the weighted media preferences. In such a case, a media preference threshold may be implemented such that a determination is made that the media item should be played only if the average or sum of the weighted media preferences exceeds the threshold. Other examples are also possible.

In some further cases, determining whether the media item should be played may further involve determining when the media item was most recently played, and/or how frequently the media item is played. Continuing with the weighted media preferences and media preference threshold example above, if the media item has been recently played, the media preference threshold for determining that the media item should be played may be more restrictive. In another words, a dynamic threshold may be implemented such that if a strong positive media preference is identified for the media item, a determination may be made that the media item should be played even if the media item has been recently played or is frequently played. On the other hand, if a mild positive media preference is identified, a determination may be made that the media item should be played only if the media item was not recently played. Other examples are also possible.

As shown in FIG. 6, if a determination is made that the media item should be played, the method 600 may proceed to block 610, involving causing the media item to be played. In one example, causing the media item to be played may involve allowing and/or directing the media playback system 506 to proceed to play the media item provided by the service provider 502 without any further action. In another example, causing the media item to be played may involve sending to the media playback system 506 an indication that the media item is to be played. In one example, the media item may be provided to the playback device from the service provider 502 via another device in the media playback system 506 or the media system server 504. In such a case, a transmission or forwarding of the media item by the other device in the media playback system 506 to the playback device may indicate that the media item is to be played.

Alternatively, if a determination is made that the media item should not be played, the method 600 may proceed to block 608, which involves sending an indication that the media item is not to be played. In one example, the indication may inform the media playback system 506 that the media item will not be provided because a determination is made that the media item should not be played. In response to receiving the indication that the media item is not to be played, the media playback system 506 will not play the media item.

In one example, the indication may be sent directly to the service provider 502. In another example, the media system server 504 may send the indication to the media playback system 506, which may, upon receiving the indication, send the indication to the service provider 502. In one case, the media playback system 506 or media system server 504 may also send a request for different media content. In this case, when the different media content is provided by the service provider 502 and is available to be played by the playback device, the method 600 may loop back to block 602 to determine whether the different media content is to be played.

In one example, the indication may include media preference data indicating a negative media preference associated between the media item that is not to be played, and the user account used to access the server provider 502 may also be sent to the service provider 502. In this case, the service provider 502 may record the negative media preference for the media item in association with the user account. Other examples are also possible.

In some embodiments, an indication may also be sent to one or more controller devices in communication with the media playback system 506. The respective user interfaces of the one or more controller devices may accordingly display an indication that a media item was not played based on an identified media preference. In some cases, a list of media items that were provided, or attempted to be provided, but not played due to identified media preferences may be compiled provided on the respective user interfaces. Other examples are also possible.

One having ordinary skill in the art will appreciate that the examples discussed above may be applied in various media playback scenarios. For instance, the embodiments described herein may generally apply to a scenario in which the service provider 502 provides a media item to the media playback system that was not specifically requested. On the other hand, however, if the media item was explicitly and specifically selected for playback, the media item may be played whether any media preference, positive or negative is associated with corresponding media item(s) in the preference database 700. In such a case, the process of identifying a media preference in the preference database 700 may be bypassed. Alternatively, an indication that the media item was explicitly and specifically selected may override media preferences in the preference database. Other examples are also possible.

In addition to the scenarios described above, embodiments herein may also be implemented and/or applied in other media playback scenarios to achieve similar or difference purposes as well, such as a parental control of media content. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves managing media playback based on media preferences. In one embodiment, a method is provided. The method involves receiving, by a computing device, data indicating that a media item is available to be played by a playback device, and based on the received data, identifying, by the computing device, in a preference database associated with the media playback system, a media preference. The method also involves, based on the identified media preference, determining, by the computing device, that the media item is not to be played by the playback device, and sending, by the computing device, an indication that the media item is not to be played.

In another embodiment, a device is provided. The device includes a processor and memory having stored thereon instructions executable by the processor to cause the device to perform functions. The functions include receiving data indicating that a media item is available to be played by a playback device, and based on the received data, identifying in a preference database associated with the media playback system, a media preference. The functions also include, based on the identified media preference, determining that the media item is not to be played by the playback device, and sending an indication that the media item is not to be played.

In another embodiment, a non-transitory computer readable memory is provided. The non-transitory computer readable memory has stored thereon instructions executable by a computing device to cause the computing device to perform functions. The functions include receiving data indicating that a media item is available to be played by a playback device, and based on the received data, identifying in a preference database associated with the media playback system, a media preference. The functions also include, based on the identified media preference, determining that the media item is not to be played by the playback device, and sending an indication that the media item is not to be played.

In another embodiment, a method is provided. The method involves receiving, by a computing device, data indicating that a media item is available to be played by a playback device, and based on the information associated with the media item, identifying, by the computing device, a media preference. The method further involves, based on the identified media preference, determining that the media item is to be played by the playback device, and causing the media item to be played.

In another embodiment, a device is provided. The device includes a processor and memory having stored thereon instructions executable by the processor to cause the device to perform functions. The functions include receiving data indicating that a media item is available to be played by a playback device, and based on the information associated with the media item, identifying a media preference. The functions further include, based on the identified media preference, determining that the media item is to be played by the playback device, and causing the media item to be played.

In another embodiment, a non-transitory computer readable memory is provided. The non-transitory computer readable memory has stored thereon instructions executable by a computing device to cause the computing device to perform functions. The functions include receiving data indicating that a media item is available to be played by a playback device, and based on the information associated with the media item, identifying a media preference. The functions further include, based on the identified media preference, determining that the media item is to be played by the playback device, and causing the media item to be played.

In another embodiment, a method is provided. The method involves receiving, by a computing device, data indicating that a media item is available to be played by a playback device, and based on the received data, identifying, by the computing device, a media preference. The method further involves, based on the identified media preference, determining, by the computing device, one of the following: (a) that the media item is not to be played by the playback device, and (b) that the media item is to be played by the playback device. If a determination is made that the media item is not to be played by the playback device, the method involves sending, by the computing device, an indication that the media item is not to be played. If a determination is made that the media item is to be played, the method involves causing, by the computing device, the media item to be played.

In another embodiment, a device is provided. The device includes a processor and memory having stored thereon instructions executable by the processor to cause the device to perform functions. The functions include receiving data indicating that a media item is available to be played by a playback device, and based on the received data, a media preference. The functions further include, based on the identified media preference, determining one of the following: (a) that the media item is not to be played by the playback device, and (b) that the media item is to be played by the playback device. If a determination is made that the media item is not to be played by the playback device, the functions include sending an indication that the media item is not to be played. If a determination is made that the media item is to be played, the functions include causing the media item to be played.

In another embodiment, a non-transitory computer readable memory is provided. The non-transitory computer readable memory has stored thereon instructions executable by a computing device to cause the computing device to perform functions. The functions include receiving data indicating that a media item is available to be played by a playback device, and based on the received data, identifying a media preference. The functions further include, based on the identified media preference, determining one of the following: (a) that the media item is not to be played by the playback device, and (b) that the media item is to be played by the playback device. If a determination is made that the media item is not to be played by the playback device, the functions include sending an indication that the media item is not to be played. If a determination is made that the media item is to be played, the functions include causing the media item to be played.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A method comprising:
   transmitting, via a computing device over one or more networks to a first media service, a request for media content corresponding to a first playback preference for playback by a media playback system, wherein the media playback system is associated with a playback queue, and the media playback system is configured to play from the playback queue;
   after transmitting the request, receiving, via the computing device over the one or more networks from the first media service, data indicating a playlist comprising a first media item and a second media item for playback by the media playback system, wherein the playlist corresponds to the first playback preference;
   based on the received data, identifying, via the computing device, in a preference database associated with the media playback system, a media preference associated with the first media item, wherein the media preference is independent of the first media service, wherein the preference database comprises media preference information that is (i) associated with a plurality of media services and (ii) stored prior to receiving the data indicating the playlist;
   based on the identified media preference, determining, via the computing device, that the first media item is not to be played by the media playback system; and
   based on determining that the first media item is not to be played by the media playback system, causing, via the computing device, the first media item to not be included in the playback queue associated with the media playback system, wherein causing the first media item to not be included in the playback queue comprises sending, via the computing device to the media playback system, an indication that the first media item is not to be played.

2. The method of claim 1, further comprising:
   based on the received data, identifying, via the computing device, in the preference database associated with the media playback system, a second media preference associated with the second media item, wherein the second media preference is independent of the first media service;
   based on the identified second media preference, determining, via the computing device, that the second media item is to be played by the media playback system; and
   based on determining that the second media item is to be played by the media playback system, causing, via the computing device, the second media item to be included in the playback queue associated with the media playback system.

3. The method of claim 1, further comprising:
   sending, via the computing device to the first media service, a request for a different media item.

4. The method of claim 1, wherein the identified media preference is associated with at least two media services different from the first media service.

5. The method of claim 1, wherein the identified media preference is associated with a second media service.

6. The method of claim 1, wherein the data identifies a service-provider identification of the first media item.

7. The method of claim 1, wherein the media playback system comprises one or more playback devices configurable to play media content in synchrony.

8. A computing device comprising:
   a processor; and
   memory having stored thereon instructions executable by the processor to cause the computing device to perform functions comprising:
      transmitting, over one or more networks to a first media service, a request for media content corresponding to a first preference for playback by a media playback system, wherein the media playback system is associated with a playback queue, and the media playback system is configured to play from the playback queue;
      after transmitting the request, receiving, over the one or more networks from the first media service, data indicating a playlist comprising a first media item and a second media item for playback by the media playback system, wherein the playlist corresponds to the first playback preference;
      based on the received data, identifying, in a preference database associated with the media playback system, a media preference associated with the first media item, wherein the media preference is independent of the first media service, wherein the preference database comprises media preference information that is (i) associated with a plurality of media services and (ii) stored prior to receiving the data indicating the playlist;
      based on the identified media preference, determining that the first media item is not to be played by the media playback system; and
      based on determining that the first media item is to be played by the media playback system, causing the first media item to be included in the playback queue associated with the media playback system.

9. The computing device of claim 8, wherein the causing the first media item to be included in the playback queue associated with the media playback system comprises:
   sending, to the media playback system, an indication that the first media item is to be played.

10. The computing device of claim 8, wherein the identified media preference is associated with a second media service.

11. The computing device of claim 8, wherein the data identifies a service-provider identification of the first media item.

12. The computing device of claim 8, wherein the media playback system comprises one or more playback devices configurable to play media content in synchrony.

13. A non-transitory computer readable medium having stored thereon instructions executable by a computing device to cause the computing device to perform functions comprising:
   transmitting, over one or more networks to a first media service, a request for media content corresponding to a first preference for playback by a media playback system, wherein the media playback system is associated with a playback queue, and the media playback system is configured to play from the playback queue;

after transmitting the request, receiving, over the one or more networks from the first media service, data indicating a playlist comprising a first media item and a second media item for playback by the media playback system, wherein the playlist corresponds to the first playback preference;

based on the received data, identifying, in a preference database associated with the media playback system, a media preference associated with the first media item, wherein the media preference is independent of the first media service, wherein the preference database comprises media preference information that is (i) associated with a plurality of media services and (ii) stored prior to receiving the data indicating the playlist;

based on the identified media preference, determining one of the following: (a) that the first media item is not to be played by the media playback system and (b) that the first media item is to be played by the media playback system;

if a determination is made that the first media item is not to be played by the media playback system, causing the first media item to not be included in the playback queue associated with the media playback system; and if a determination is made that the first media item is to be played, causing the first media item to be included in the playback queue.

14. The non-transitory computer readable medium of claim 13, wherein the causing the first media item to be included in the playback queue comprises:

sending, to the media playback system, an indication that the first media item is to be played.

15. The non-transitory computer readable medium of claim 13, wherein causing the first media item to not be included in a playback queue associated with the media playback system comprises:

sending, to the first media service, a request for a different media item.

16. The non-transitory computer readable medium of claim 13, wherein the identified media preference is associated with at least two media services different from the first media service.

17. The non-transitory computer readable medium of claim 13, wherein the data identifies a service-provider identification of the first media item.

18. The non-transitory computer readable medium of claim 13, wherein the media playback system comprises one or more playback devices configurable to play media content in synchrony.

19. The method of claim 1, wherein the identified media preference is based on a plurality of first media preferences, and wherein determining that the first media item is not to be played by the media playback system comprises:

determining, via the computing device, whether a combination of the plurality of first media preferences is greater than a threshold; and in response to determining that the combination of the plurality of first media preferences is less than the threshold, determining that the first media item is not to be played by the media playback system.

20. The method of claim 1, further comprising:

transmitting, via the computing device to a second media service, a second request for media content based on second media preferences associated with an account with the second media service;

after transmitting the second request, receiving, via the computing device from the second media service, second data indicating a curated playlist of media items, the curated playlist comprising a plurality of third media items for playback by the media playback system;

for each of the plurality of third media items, identifying, via the computing device, in the preference database, a second media preference associated with the second media item;

for each of the plurality of third media items, determining, via the computing device, one of the following: (a) that a respective third media item is not to be played by the media playback system based on the second media preference and (b) that the respective third media item is to be played by the media playback system based on the second media preference;

if a determination is made that the respective third media item is not to be played by the media playback system, sending an indication that the respective third media item is not to be played; and if a determination is made that the respective third media is to be played by the media playback system, causing the respective third media item to be played.

* * * * *